(12) United States Patent
Horigome

(10) Patent No.: US 7,268,819 B2
(45) Date of Patent: Sep. 11, 2007

(54) SCANNING CAMERA

(75) Inventor: Yuuki Horigome, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 820 days.

(21) Appl. No.: 10/656,258

(22) Filed: Sep. 8, 2003

(65) Prior Publication Data
US 2004/0070684 A1  Apr. 15, 2004

(30) Foreign Application Priority Data
Sep. 10, 2002  (JP) ............... 2002-0264707

(51) Int. Cl.
*H04N 5/225* (2006.01)
*H04N 7/18* (2006.01)

(52) U.S. Cl. ...................... 348/375; 348/143
(58) Field of Classification Search ............... 348/372, 348/374; 396/427, 20; 248/183.4, 186.2
See application file for complete search history.

(56) References Cited

U.S. PATENT DOCUMENTS 4,945,367 A * 7/1990 Blackshear ............ 348/143
5,652,619 A * 7/1997 Nakamura et al. ..... 348/211.12
6,356,308 B1 * 3/2002 Hovanky ................ 348/373
7,000,883 B2 * 2/2006 Mercadal et al. ........ 248/660

FOREIGN PATENT DOCUMENTS

JP  09-069976  *  3/1997

OTHER PUBLICATIONS

Patent Abstract of Japan, No. 09-069976, publication date Mar. 11, 1997, Applicant Shimadzu Corporation.
Patent Abstract of Japan, No. 2002-131806, publication date May 9, 2002, Applicant Nisca Corporation.

* cited by examiner

*Primary Examiner*—David Ometz
*Assistant Examiner*—Luong T. Nguyen
(74) *Attorney, Agent, or Firm*—Manabu Kanesaka

(57) ABSTRACT

A scanning camera includes an imaging device for capturing an image of an object with a photoelectric-conversion imaging element; a support shaft for supporting the imaging device to change a photographing direction of the imaging device; a frame for supporting the imaging device through the support shaft; a driver fixed to the frame for rotating the imaging device; and a flexible connector electrically connected to the imaging element and extending to the frame from the imaging device. The flexible connector extends from at least two positions at both sides relative to an axis of the support shaft such that the two portions are parallel to the axis of the support shaft.

12 Claims, 6 Drawing Sheets

SCANNING CAMERA

BACKGROUND OF THE INVENTION AND RELATED ART STATEMENT

The present invention relates to a camera such as a television camera and a digital still camera, in particular, to a scanning camera capable of changing a photographing direction.

There have been conventionally known a variety of scanning cameras such as a television camera and a digital still camera capable of changing a photographing direction with a remote control operation. Such a scanning camera is employed as, for example, a wide-area surveillance camera. To cover a wide area, the scanning camera changes the photographing direction vertically (in a tilting operation) and horizontally (in a panning operation). Accordingly, it is possible to reduce the number of cameras to cover a wide surveillance area.

A scanning camera is also used in a video teleconference system in which participants at remote places can talk with each other using a high-speed communication line. The scanning camera can continuously aim at any participant in the conference through optimizing a photographing direction.

In the scanning camera, a movable frame supports an entire body of the scanning camera, and a motor moves the movable frame to change a photographing direction vertically and horizontally. In such a configuration, it is necessary to rotate the entire body vertically and horizontally, thereby increasing a size of the scanning camera.

A scanning camera has been proposed to reduce a size, in which only a minimum element required for shooting a picture, i.e. a section composed of a photo lens and an imaging element, is rotated vertically and horizontally. Japanese Patent Publication (Kokai) No. 09-69976 has disclosed a camera, in which a signal processing board is mounted on a horizontally rotatable platform. An imaging device is mounted on a vertically rotatable support base mounted on the platform to change a photographing direction vertically. The camera can rotate vertically with respect to the signal processing board, and the camera is electrically connected to the signal processing board with a flexible cable to be rotatable.

Japanese Patent Publication (Kokai) No. 2002-131806 has disclosed another camera, in which only a minimum element required for shooting a picture, i.e. a section composed of a photo lens and an imaging element, is rotated vertically and horizontally. The moving portion has a small size, thereby requiring only a small drive force and low power consumption. The scanning camera itself also becomes smaller. The movable imaging section is electrically connected to a signal processing board with a flexible cable to be rotatable.

In the conventional cameras described above, a flexible cable is used to electrically connect between a moving module and a fixed module. The flexible cable is easily bendable in a planar surface thereof, and exhibits flexibility in some extent. The flexibility may cause a small resistance as a load on a driver for changing the photographing direction of the camera.

In Japanese Patent Publication (Kokai) No. 09-69976, a long flexible cable extends from the imaging device to the signal processing board to minimize an effect of bending resistance thereof. However, a longer cable results in a higher cost and a larger space.

In Japanese Patent Publication (Kokai) No. 2002-131806, a driver rotates the imaging section vertically and horizontally, thereby obtaining a small size. In the camera, a single flexible cable is used for the connection. Thus, the flexible cable is bendable in one of the tilting and panning operations, and is twisted in the other of the tilting and panning operations, thereby applying a load on the driver due to the twisting of the flexible cable. Further, the flexible cable tends to be short, thereby increasing the effect of the bending resistance. When the camera moves in a wider angle, the bending resistance increases. In general, a smaller camera device has a shorter flexible cable, thereby increasing the bending resistance of the flexible cable.

Accordingly, it is an object of the present invention to provide a compact scanning camera with low power consumption and a minimum bending resistance of a flexible cable within a limited space for accommodating the flexible cable.

Further objects and advantages of the invention will be apparent from the following description of the invention.

SUMMARY OF THE INVENTION

According to the first aspect of the present invention, a scanning camera includes an imaging device for capturing an image of an object with a photoelectric-conversion imaging element; a support shaft for supporting the imaging device to change a photographing direction of the imaging device; a frame for supporting the imaging device through the support shaft; a driver fixed to the frame for rotating the imaging device; and a flexible connector electrically connected to the imaging element and extending from the imaging device. The flexible connector extends from at least two positions at both sides of an axis of the support shaft such that a planar portion of the flexible connector is in parallel with the axis of the support shaft, and is connected to the frame.

In the first aspect of the present invention, the flexible connector extends from at least two positions at both sides of the axis of the support shaft. Therefore, when the photographing direction is changed, bending resistances of the flexible connector at the two positions cancel out with each other, thereby reducing a force for driving the camera. It is also possible to reduce a variation in the bending resistance of the flexible connector according to an angle of tilting or panning.

According to the second aspect of the present invention, the flexible connector extends toward the photographing direction further than the imaging element, and is disposed within a space for a rotational movement of the imaging device. A space opposite to the photographing direction of the imaging element becomes available, thereby making a layout of the driver more flexible and making the scanning camera small.

According to the third aspect of the present invention, the flexible connector extends from both sides of the axis of the support shaft with a substantially identical elastic force when the imaging device is in a predetermined photographing direction. When a direction used most frequently is set to be the predetermined photographing direction, it is possible to set the camera at the photographing direction without driving power. In a case that a pulse motor with no self-sustaining function is used for the driver, the camera is automatically returned to the predetermined direction when the driver is turned off.

According to the fourth aspect of the present invention, the flexible connector extends from the imaging device at positions symmetrical with respect to the axis of the support shaft. With this configuration, it is possible to efficiently cancel out the bending resistances of the flexible connector.

According to the fifth aspect of the present invention, a scanning camera includes an imaging device for capturing an image of an object with a photoelectric-conversion imaging element; a first support shaft for supporting the imaging device to change a photographing direction of the imaging device; a first frame for supporting the imaging device through the first support shaft; a first driver fixed to the first frame for rotating the imaging device; a second support shaft for supporting the first frame to be rotatable; a second frame for supporting the first frame through the second support shaft; a second driver fixed to the second frame for rotating the first frame; and a flexible connector electrically connected to the imaging element and extending from the imaging device. The flexible connector extends from at least two positions at both sides of an axis of the first support shaft so that a planar portion of the flexible connector is in parallel with the axis of the first support shaft, and is connected to the first frame. The flexible connector extends from the first frame from at least two positions at both sides of an axis of the second support shaft so that the planar portion of the flexible connector is in parallel with the axis of the second support shaft, and is connected to the second frame.

In the present invention, the scanning camera is rotatable in two directions, i.e. a vertical direction and a horizontal direction. The bending resistances of the flexible connector in the two directions cancel out with each other. Therefore, it is possible to change the photographing direction with a small force, and reduce a variation in the bending resistance according to a rotational angle.

DETAILED DESCRIPTION OF PREFERRED EMBODIMENTS

Figure 1:
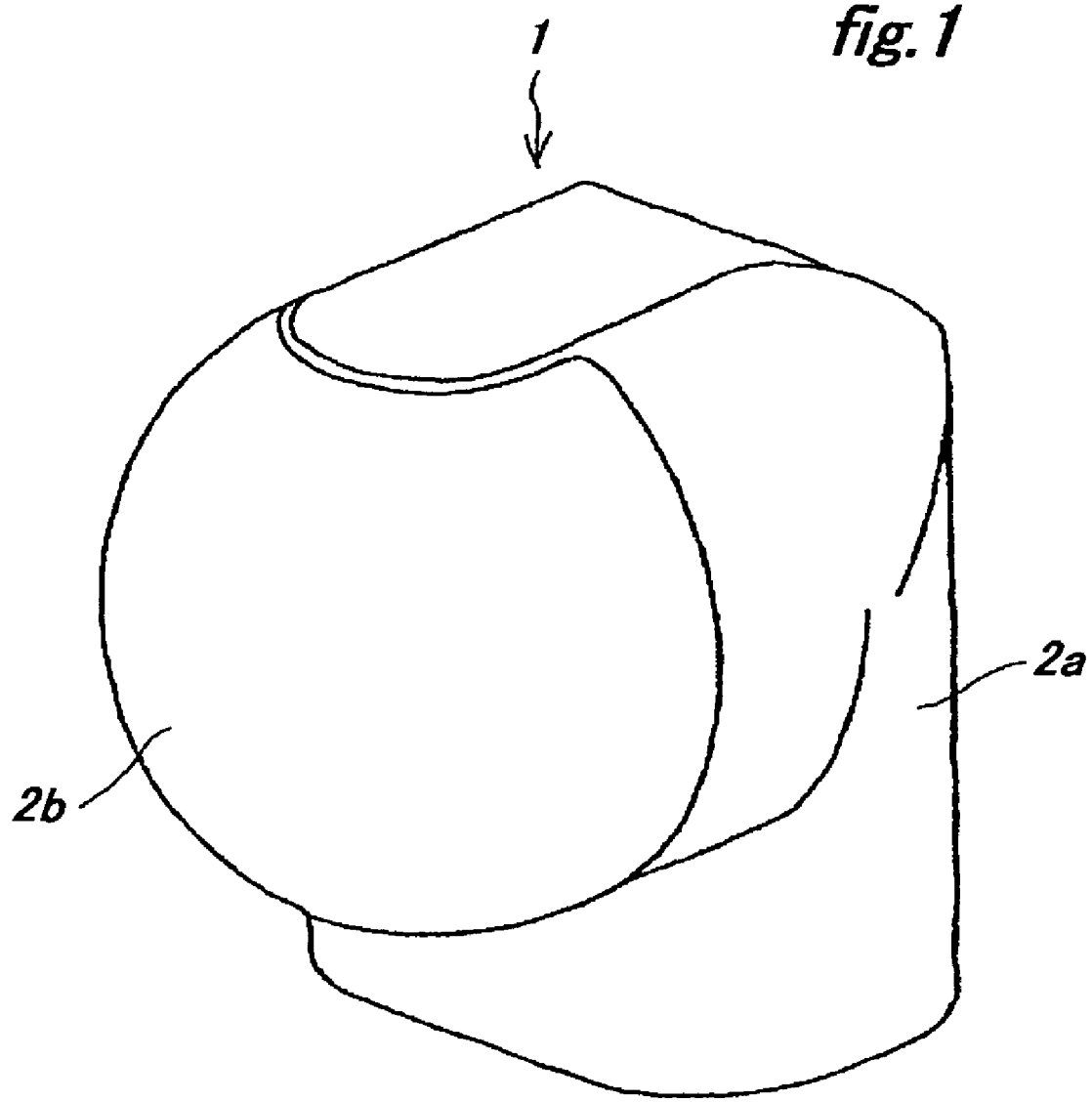
FIG. 1 is a view showing a scanning camera according to the first embodiment of the present invention.

Hereunder, embodiments of the present invention will be explained with reference to the accompanying drawings. FIG. 1 is a view showing a scanning camera 1 according to the first embodiment of the present invention. The scanning camera 1 includes a helmet-shaped external cover 2a covering a camera body (discussed later), and a semispherical lens cover 2b covering a front opening of the external cover 2a. The lens cover 2b is made of a light-transmissive transparent material such as polycarbonate (PC). The external cover 2a is made of, for example, acrylonitrile/butadiene/styrene (ABS).

Figure 2:
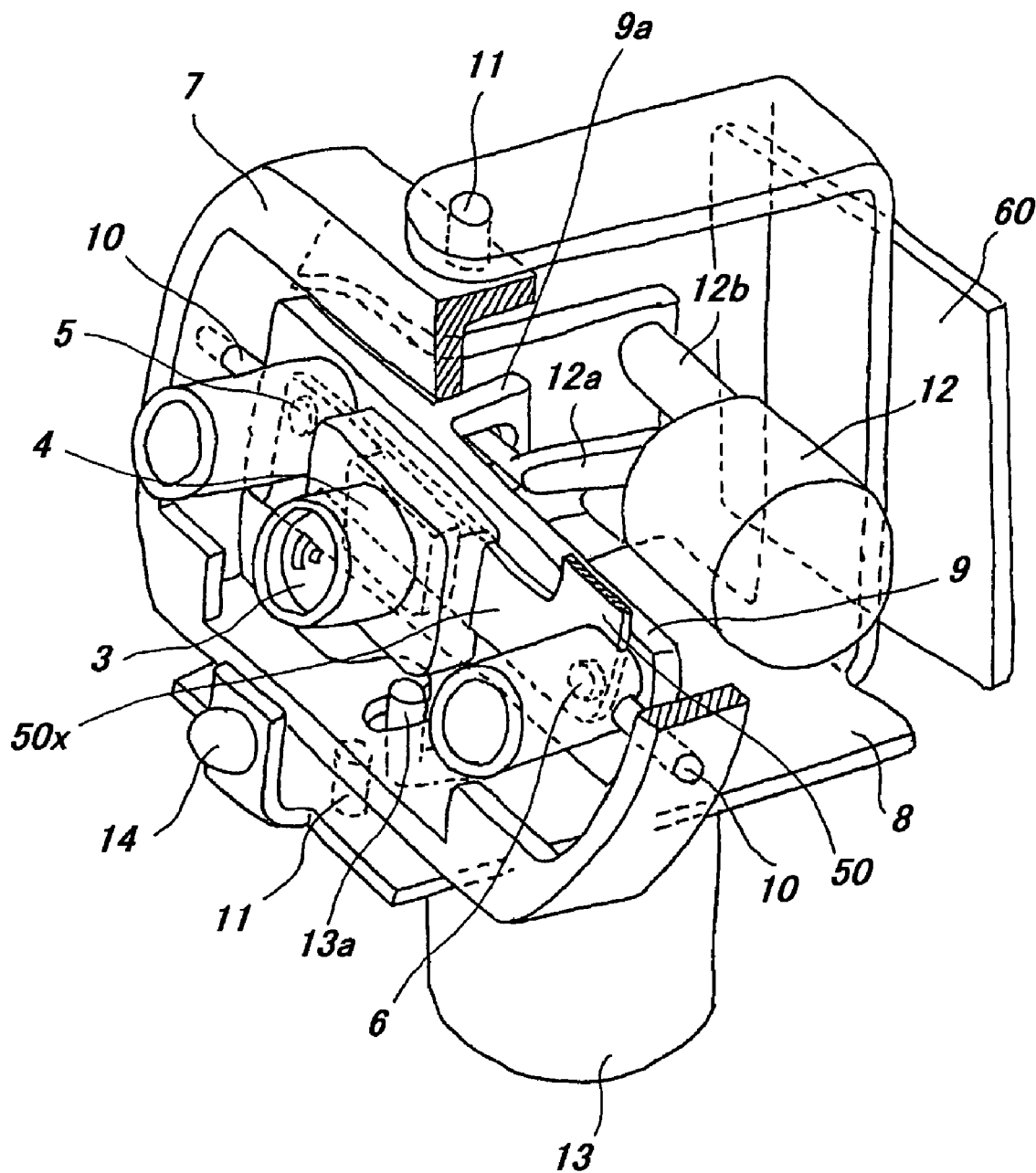
FIG. 2 is a view showing an internal structure of the scanning camera of the first embodiment with an electrical circuit thereof removed.

As shown in FIG. 2, the camera body includes a second frame 8 made of sheet metal and functioning as a platform for supporting the camera body. The second frame 8 includes a square portion at a center thereof, and a projection projecting upwardly at a front center of the camera body in a photographing direction. An infrared light-emitting diode (LED) 14 emitting infrared light is disposed at a front side of the projection. A support portion having an L-shaped cross section extends upwardly at a side of the second frame 8 opposite to the projection (a rear side of the camera).

Second support shafts 11 are formed on the second frame 8 at the center thereof close to the projection and at a front end of the support portion. The second support shafts 11 support a first frame 7 made of a resin so that the first frame 7 is rotatable in a pan direction (a horizontal direction). The second support shafts 11 are supported at the center of the second frame 8 and the support portion of the second frame 8. The first frame 7 has a substantially square shape with a front middle portion as a center thereof viewed from the front. In FIG. 2, for the sake of presentation, the first frame 7 is partially cut away.

An imaging device 9 is disposed at an inside of the first frame 7. An imaging element 4 such as a charge-coupled device (CCD) for converting light into an electrical signal is disposed at a center of the imaging device 9. A flexible cable 50 is electrically connected to the imaging element 4. A fixed focus lens without an infrared-cut filter typically used in an optical system is used for a photo lens 3 for photographing an object. The imaging device 9 in the first embodiment includes the imaging element 4 and the photo lens 3 without the flexible cable 50.

A cylindrical light emitting element 5 and a cylindrical light receiving element 6 are arranged at both sides of the photo lens 3 in the imaging device 9. The light emitting element 5 emits an infrared light beam of a size of 3 mm in the photographing direction of the scanning camera 1. The light receiving element 6 receives a light beam reflected from an object when the light beam from the light emitting element 5 is incident on the object. The light emitting element 5, the imaging element 4, and the light receiving element 6 are generally arranged linearly in a horizontal line. The light emitting element 5 and the light receiving element 6 form an active ranging unit for detecting an object. The ranging unit covers a distance of about 5 m in the range detection thereof.

The imaging element 4, the light emitting element 5, and the light receiving element 6 are mounted on a circuit section 50x of the flexible cable 50. A portion of a control circuit is also mounted on the circuit section 50x. The flexible cable 50 is connected to a control circuit board 60 including a CCD control circuit fixed to the second frame, an image processing circuit, and a driver control circuit (described later). A circuit portion of the flexible cable 50 is not shown in FIG. 2.

A signal cable extends from the control circuit board 60 toward an outside of the scanning camera 1. The signal cable is connected to a connector (not shown) disposed at a backside of the external cover 2a to connect to a host such as a personal computer.

First support shafts 10 extend from the imaging device 9 at both sides of the imaging element 4 in a substantially horizontal direction. The first support shafts 10 support the imaging device 9 so that the imaging device 9 tilts up and down (in a vertical direction) with respect to the first frame 7. The first support shafts 10 extend coaxially, and are supported on the first frame 7. A link portion 9a extends from a backside of the imaging device 9 in a backward direction of the camera body. The link portion 9a has an elongated slot at a center thereof.

A motor support plate having an L-shape cross section extends from one side of the first frame 7 in a backward direction. A stepping motor (hereinafter referred to as a tilt motor) 12 serving as a driver for the tilt operation in a substantially vertical direction is fixed to an end portion of the motor support plate through two cylindrical columns 12b projecting from the stepping motor 12. An L-shaped driving lever 12a is secured to a motor shaft of the tilt motor 12. An end of the driving lever 12a is inserted into the elongated slot of the link portion 9a.

A stepping motor (hereinafter referred to as a pan motor) 13 serving as a driver for panning the first frame 7 in a substantially horizontal direction is fixed to a center bottom surface of the second frame 8 through two cylindrical fixing arms (not shown) extending from the pan motor 13. An L-shaped driving lever 13a is secured to a motor shaft of the pan motor 13. An end of the driving lever 13a is inserted into a U-shaped slot formed in a lower center portion of the first frame 7.

Circuits of the tilt motor 12 and the pan motor 13 (not shown in FIG. 2) are electrically connected to the control circuit board 60. The stepping motors are used as the drivers in the first embodiment. Alternatively, a meter may be used for rotating the driving levers 12a and 13a within an angular range less than 180 degrees.

Figure 3:
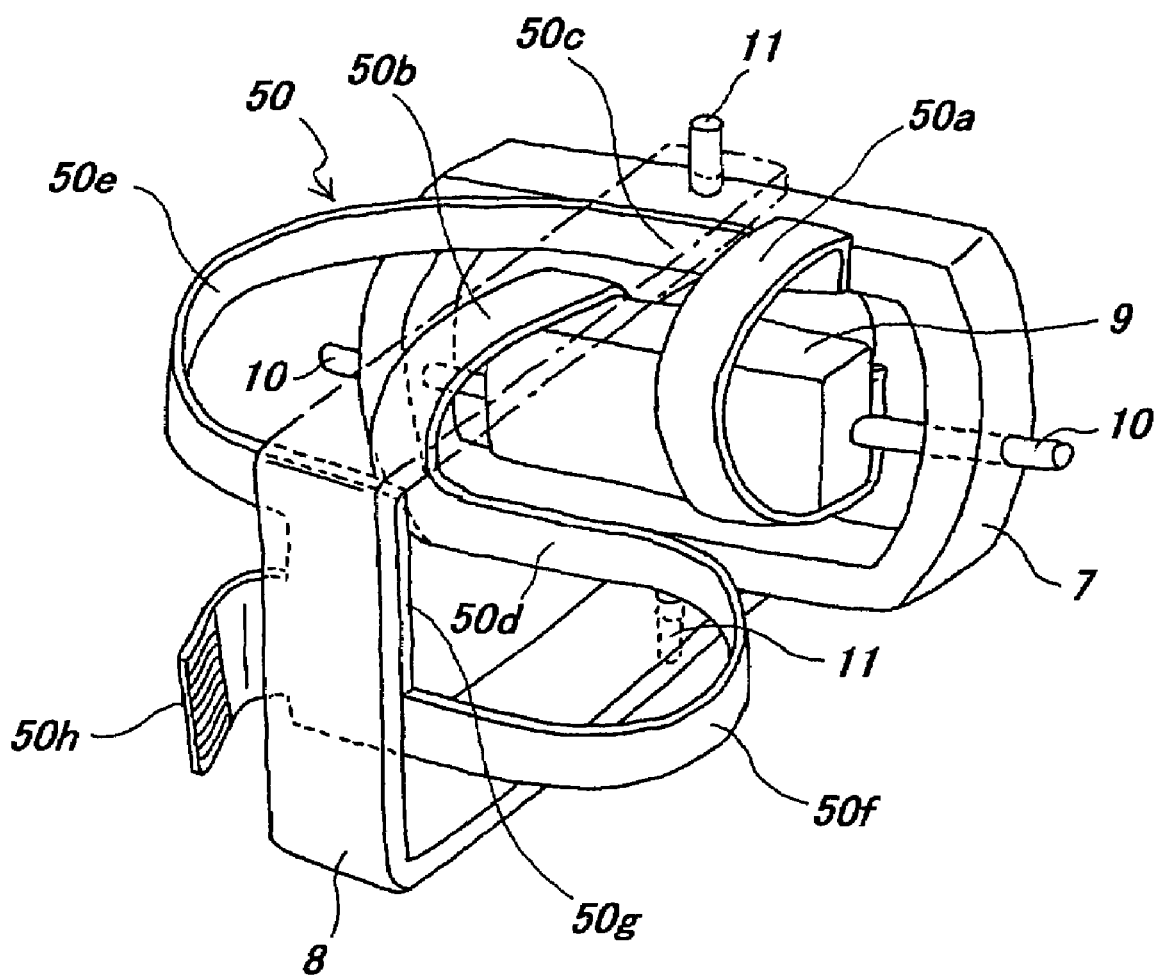
FIG. 3 is a view showing a configuration of flexible cables in the scanning camera according to the first embodiment of the present invention.

FIG. 3 is a view showing a wiring of the flexible cable 50 from the imaging device 9 to the control circuit board fixed on the second frame 8. To simplify the drawing, the drivers are removed.

As shown in FIG. 3, the flexible cable 50 extends from the imaging device 9, and is attached to the first frame 7 through a right-hand wiring section 50a and a left-hand wiring section 50b at an upper fixing section 50c and a lower fixing section 50d. An upper wiring section 50e and a lower wiring section 50f extending from the first frame 7 are attached to the second frame 8 at the second frame fixing section 50g.

The flexible cable 50 extends from the imaging device 9 at positions substantially symmetrical with respect to an axis of the first support shafts 10 with flat portions of the flexible cable 50 in parallel with the axis of the first support shafts 10. The flexible cable 50 extends from the first frame 7 at positions substantially symmetrical relative to an axis of the second support shafts 11 with the flat portions thereof in parallel with the axis of the second support shafts 11.

The two wiring sections of the flexible cable 50 are joined at the second frame fixing section 50g. The second frame fixing section 50g is provided with a connector section 50h for connector connection. The first embodiment employs a single flexible cable along the entire wiring path. Alternatively, the upper fixing section 50c, the lower fixing section 50d, and the second frame fixing section 50g may be replaced with non-flexible printed circuit boards interconnected with flexible cables.

An operation of the scanning camera 1 of the first embodiment will be explained next with reference to FIG. 2. The driving lever 12a of the tilt motor 12 fixed to the first frame 7 rotates in response to a driving signal from the control circuit board 60. The end of the driving lever 12a is inserted into the elongated slot of the link portion 9a of the imaging device 9, and the imaging device 9 is tilted up and down with respect to the first frame 7. Accordingly, it is possible to tilt the photographing direction of the imaging device 9 including the imaging element 4 and the photo lens 3.

The pan motor 13 fixed to the second frame 8 rotates the driving lever 13a thereof in response to a driving signal from the control circuit board 60. The end of the driving lever 13a is inserted into the U-shaped slot formed in the lower portion of the first frame 7, and the first frame 7 is panned with respect to the second frame 8. Accordingly, it is possible to pan the photographing direction of the imaging device 9 with the pan motor 13.

The light emitting element 5 and the light receiving element 6 constituting an active ranging unit are fixed to the imaging device 9 for changing a ranging direction in the tilting operation and the panning operation. The light emitting element 5 and the light receiving element 6 measure a distance while changing the ranging direction thereof in accordance with the tilting operation and the panning operation. Accordingly, the scanning camera 1 detects an object present within about 5 m from the scanning camera 1. The photographing direction is aligned with the ranging direction, so that the scanning camera 1 stops to photograph an object in a direction that the object is detected.

The infrared LED 14 fixed to the second frame 8 emits an infrared light beam at the object when the imaging device 9 takes a photograph. The imaging device 9 has no infrared-cut filter, so that the scanning camera 1 can take a photograph of a dark object in response to infrared light reflected from the object.

Next, there will be a description regarding an operation of reducing an effect of bending resistance of the flexible cable 50 extending from the imaging device 9 to the second frame 8 when the photographing direction of the imaging device 9 shown in FIG. 3 is tilted and panned.

The flexible cable 50 extends from two positions of the imaging device 9, and is attached to the first frame 7. The right-hand wiring section 50a and the left-hand wiring section 50b are in a curved state. Accordingly, a resistance occurs in a vertical direction of the flexible cable due to elasticity of the flexible cable 50. The flexible cable 50 extends from the positions substantially symmetrical with respect to the axis of the first support shafts 10. Therefore, the right-hand wiring section 50a receives a resistance force in a direction opposite to a direction that the left-hand wiring section 50b receives a resistance force around the first support shafts 10, so that the resistance forces are cancelled out with each other.

The flexible cable 50 extends from the positions substantially symmetrical with respect to the axis of the first support shafts 10 at both sides of the axis of the first support shafts 10. The resistance forces apply the same torque to the imaging device 9 around the first support shaft 10, thereby efficiently canceling out with each other. When a plurality of wires extends from one side, it is arranged such that a sum of bending resistances of the wires balances that of the bending resistances of the wires at the other side.

In a case that a meter is used for the tilt motor, since the meter has no self-sustaining feature, the imaging device 9 is stationary at a position where an elastic force of the right-hand wiring section 50a balances an elastic force of the left-hand wiring section 50b when the power is turned off. The position may be set at a photographing direction used most frequently, thereby reducing power usage. Further, when the power to the meter is turned off, the photographing direction is automatically returns to the balanced direction The right-hand wiring section 50a and the left-hand wiring section 50b of the flexible cable 50 extend with the flat portions thereof in parallel with the axis of the first support shafts 10, and are attached to the first frame 7, so that the bending resistance of the flexible cable 50 is minimized. Also, the flexible cable 50 is prevented from twisting when the imaging device 9 rotates.

The flexible cable 50 is attached to the first frame 7 at the upper fixing section 50c and the lower fixing section 50d. An electrical wiring of the tilt motor 12 (not shown) may be connected to the flexible cable 50 at the upper fixing section 50c and the lower fixing section 50d.

The flexible cable 50 extends from the two positions of the first frame 7, and is attached to the second frame 8. The upper wiring section 50e and the lower wiring section 50f are electrically connected in a curved state. Accordingly, the resistance force of the flexible cable 50 is reduced in the same manner as discussed in the right-hand wiring section 50a and the left-hand wiring section 50b of the flexible cable 50.

Figure 4:
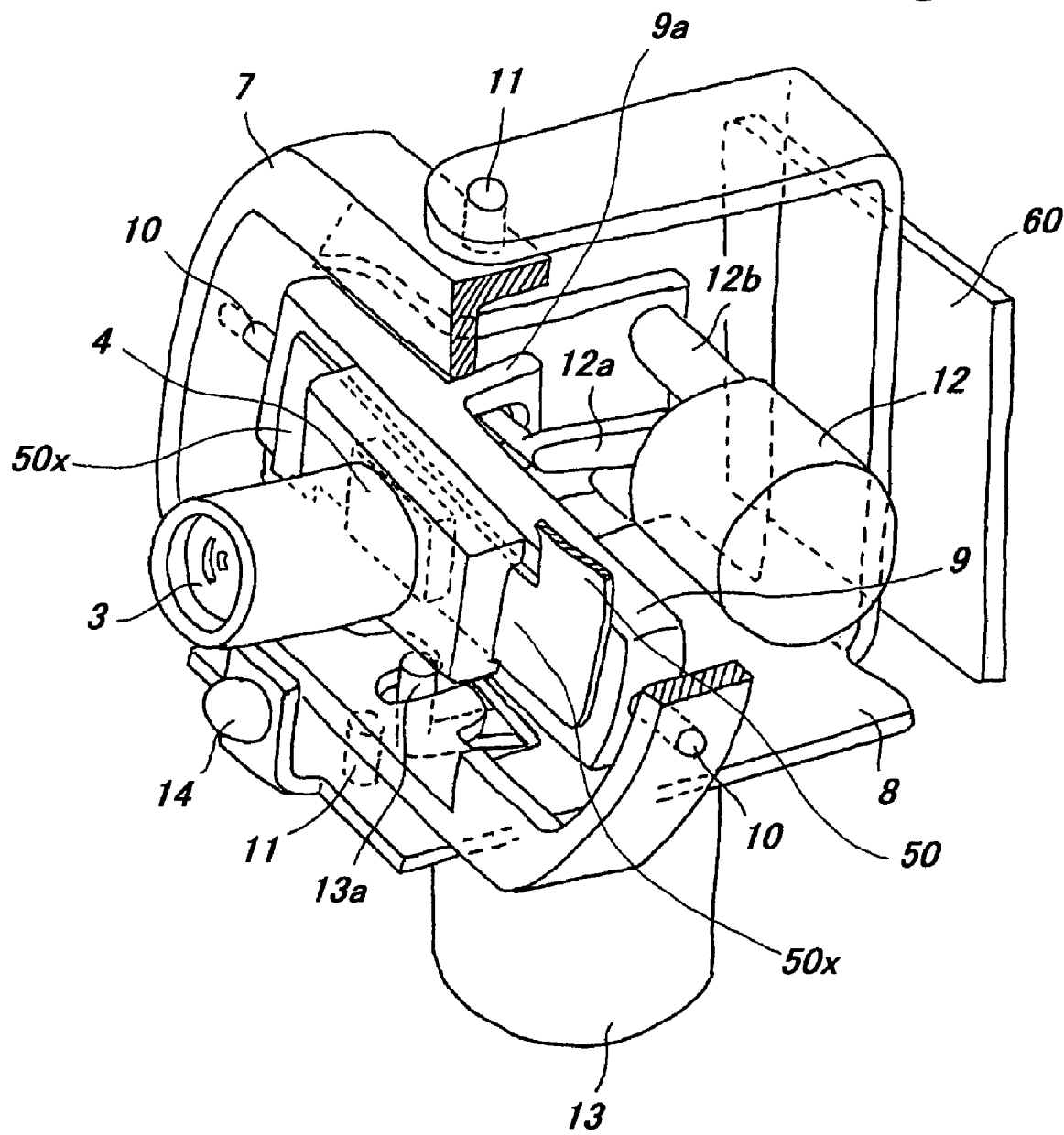
FIG. 4 is a view showing an internal structure of a scanning camera according to the second embodiment of the present invention.

Hereunder, the second embodiment of the present invention will be explained. FIG. 4 shows the second embodiment of the scanning camera in which the first frame is partly cut. An electrical wiring is not shown in FIG. 4. The scanning camera of the second embodiment has no active range finding unit.

Figure 5:
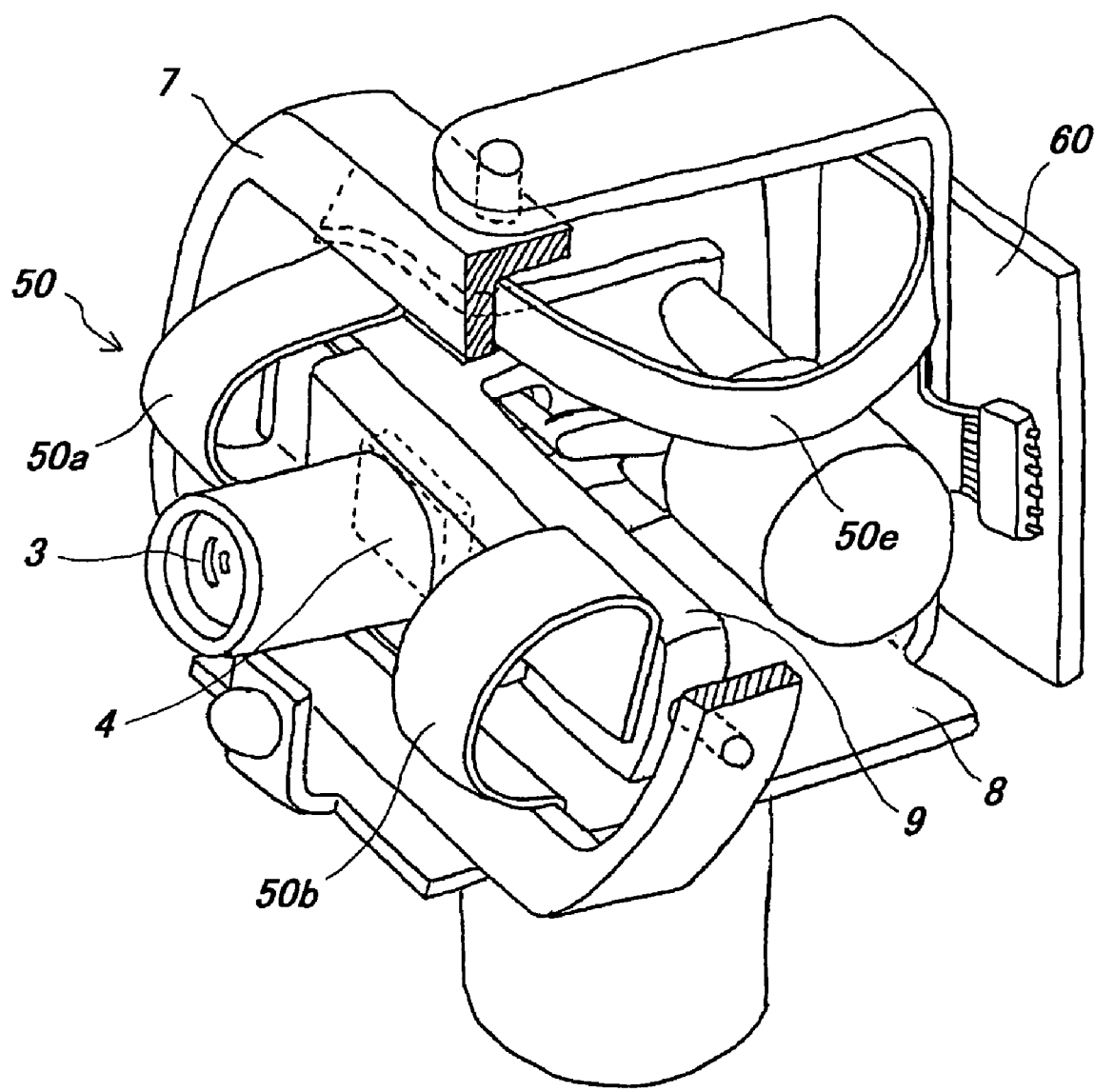
FIG. 5 is a view showing a configuration of flexible cables in the scanning camera according to the second embodiment of the present invention.

As shown in FIG. 5, the flexible cable 50 extends from two positions of the imaging device 9, and is attached to the first frame 7. The right-hand wiring section 50a and the left-hand wiring section 50b are situated at a front side of the imaging element 4.

Figure 6:
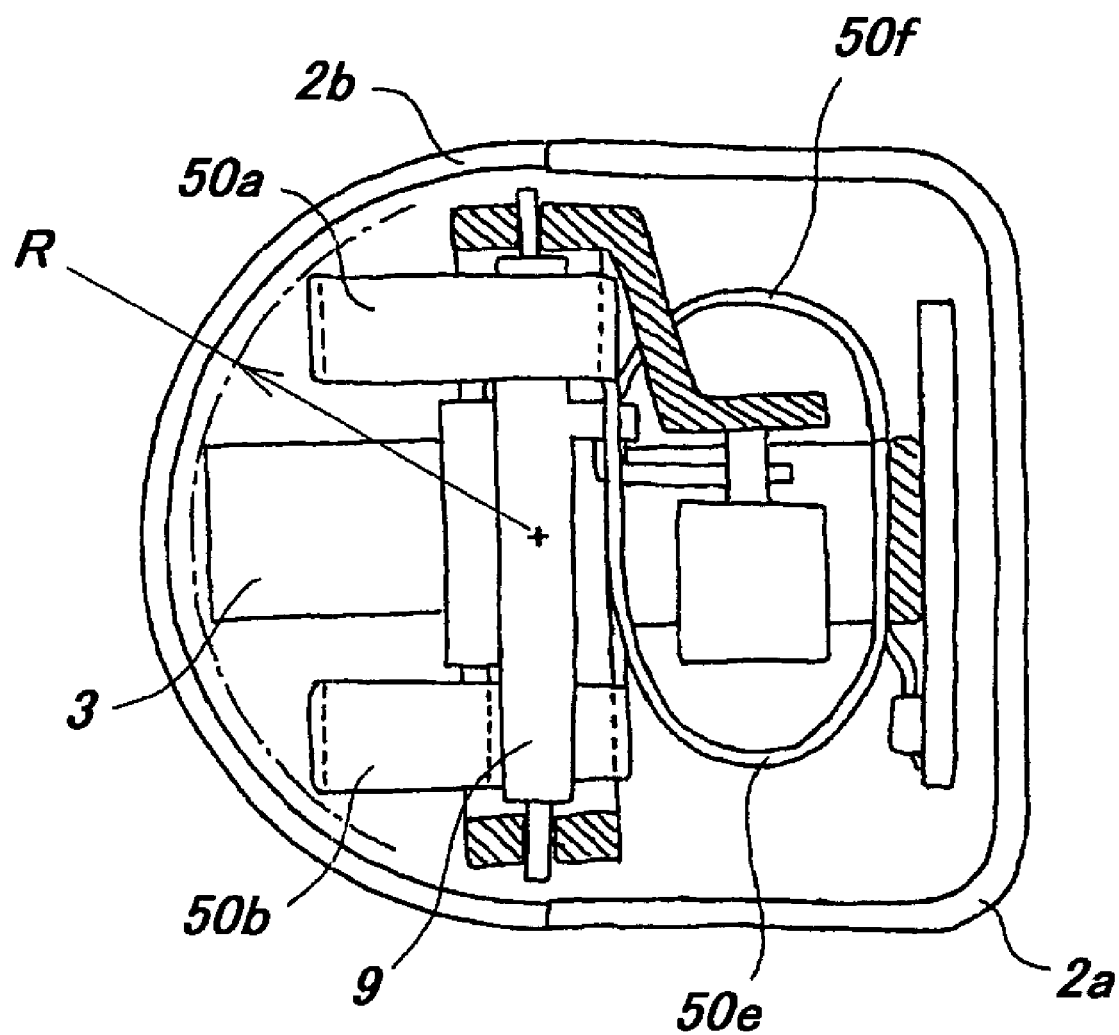
FIG. 6 is a top plan view showing the internal structure of the scanning camera of the second embodiment of the present invention.

FIG. 6 is a view showing an internal structure of the scanning camera viewed from above. The right-hand wiring section 50a and the left-hand wiring section 50b are arranged within a radius R of a rotational motion of the photo lens 3 constituting the imaging device 9.

The photo lens 3 requires a space with the radius R for scanning. The right-hand wiring section 50a and the left-hand wiring section 50b move together with the photo lens 3, thereby not interfering with the photo lens 3. Accordingly, a space behind the imaging element 4 becomes available, thereby making a layout of the driver flexible. In particular, this arrangement is appropriate for a scanning camera that changes the photographing direction in the tilting operation and the panning operation, in which the flexible cable 50 needs to be disposed in a limited space within an external cover.

The flexible cable 50 extends between the first frame 7 and the second frame 8 in the same manner as the first embodiment. The flexible cable 50 extends within the limited space such that the effect of resistance force is minimized effectively, thereby reducing a driving force of the driver for changing the photographing direction, and obtaining a small scanning camera with low power consumption.

While the invention has been explained with reference to the specific embodiments of the invention, the explanation is illustrative and the invention is limited only by the appended claims.

What is claimed is:

1. A scanning camera comprising:
an imaging device for capturing an image having an image pickup element,
a support shaft attached to the imaging device for changing a photographing direction,
a frame for supporting the imaging device through the support shaft,
a driver attached to the frame for rotating the imaging device, and
a flexible connector electrically connected to the image pickup element and having two planar portions, said two planar portions extending to the frame from at least two positions of the imaging device at opposite sides relative to an axis of the support shaft diagonally away from each other such that the two planar portions of the flexible connector are arranged parallel to the axis of the support shaft.

2. A scanning camera according to claim 1, wherein said flexible connector is arranged in front of the imaging device in the photographing direction within a range of a rotational motion of the imaging device.

3. A scanning camera according to claim 1, wherein said two planar portions of the flexible connector extending from the at least two positions of the imaging device have substantially identical elastic forces when the imaging device faces a predetermined photographing direction.

4. A scanning camera according to claim 1, wherein said two planar portions of the flexible connector extend from the imaging device substantially symmetrical with respect to the axis of the support shaft.

5. A scanning camera according to claim 1, wherein said imaging device includes two sides opposite to each other relative to the axis of the support shaft, said two planar portions being attached to the two sides away from each other diagonally.

6. A scanning camera comprising:
an imaging device for capturing an image having an image pickup element,
a first support shaft for supporting the imaging device to change a photographing direction of the imaging device,
a first frame for rotationally supporting the imaging device through the first support shaft,
a first driver attached to the first frame for rotating the imaging device,
a second support shaft attached to the first frame for rotationally supporting the first frame for changing another photographing direction,
a second frame attached to the second support shaft for supporting the first frame through the second support shaft,
a second driver attached to the second frame for rotating the first frame, and
a flexible connector electrically connected to the imaging element and having two planar portions, said two planar portions extending to the first frame from at least two positions of the imaging device at two opposite sides relative to an axis of the first support shaft such that the two planar portions are parallel to the axis of the first support shaft, said two planar portions extending from the at least two positions of the first frame to the second frame at two opposite sides relative to an axis of the second support shaft such that the planar portions are parallel to the axis of the second support shaft.

7. A scanning camera according to claim 6, wherein said flexible connector connected to the first frame is arranged in front of the imaging device in the photographing direction within a range of a rotational motion of the imaging device.

8. A scanning camera according to claim 6, wherein said two planar portions of the flexible connector connected to the first frame have substantially identical elastic forces at the two sides relative to the axis of the first support shaft when the imaging device faces a predetermined photographing direction.

9. A scanning camera according to claim 6, wherein said two planar portions of the flexible connector connected to the second frame from the first frame have substantially identical elastic forces at the two sides relative to the axis of the second support shaft when the imaging device faces a predetermined photographing direction.

10. A scanning camera according to claim 6, wherein said flexible connector extends from the imaging device substantially symmetrical with respect to the axis of the first support shaft.

11. A scanning camera according to claim 6, wherein said flexible connector extends from the first frame substantially symmetrical to the axis of the second support shaft.

12. A scanning camera according to claim 5, wherein said two planar portions attached to the two sides extend in opposite directions to cross the imaging device.

* * * * *